(12) United States Patent
Mazzola et al.

(10) Patent No.: US 10,099,453 B2
(45) Date of Patent: Oct. 16, 2018

(54) MULTILAYER STRUCTURE, A FILM MADE THEREFROM AND A PACKAGE FORMED THEREFROM

(71) Applicant: Dow Global Technologies LLC, Midland, MI (US)

(72) Inventors: Nicolas Cardoso Mazzola, Jundiai (BR); João Gargalaka, Sao Paulo (BR); Jorge Caminero Gomes, Sao Paulo (BR); Gianna Buaszczyk, Nova Praia (BR)

(73) Assignee: Dow Global Tchnologies LLC, Midland, MI (US)

( * ) Notice: Subject to any disclaimer, the term of this patent is extended or adjusted under 35 U.S.C. 154(b) by 693 days.

(21) Appl. No.: 14/519,070

(22) Filed: Oct. 20, 2014

(65) Prior Publication Data
US 2016/0107423 A1    Apr. 21, 2016

(51) Int. Cl.
*B32B 27/08* (2006.01)
*B32B 27/34* (2006.01)
(Continued)

(52) U.S. Cl.
CPC ............. *B32B 27/08* (2013.01); *B32B 1/00* (2013.01); *B32B 1/02* (2013.01); *B32B 3/00* (2013.01); *B32B 3/02* (2013.01); *B32B 3/06* (2013.01); *B32B 3/30* (2013.01); *B32B 7/00* (2013.01); *B32B 7/02* (2013.01); *B32B 7/04* (2013.01); *B32B 7/06* (2013.01); *B32B 7/12* (2013.01); *B32B 27/00* (2013.01); *B32B 27/06* (2013.01); *B32B 27/28* (2013.01); *B32B 27/30* (2013.01);
(Continued)

(58) Field of Classification Search
CPC .. B32B 1/02; B32B 7/12; B32B 27/08; B32B 2349/14; Y10T 428/1352; B65D 85/22
See application file for complete search history.

(56) References Cited

U.S. PATENT DOCUMENTS 4,128,607 A * 12/1978 Shiomura ............... C08F 4/022
                                                               525/247
4,769,261 A    9/1988 Hazelton et al.
(Continued)

FOREIGN PATENT DOCUMENTS

JP        10193530        7/1998
JP        10193531        7/1998
(Continued)

OTHER PUBLICATIONS

International Preliminary Report on Patentability for related PCT Application PCT/US2015/053920, dated May 4, 2017 (7 pgs).

*Primary Examiner* — Marc A Patterson
(74) *Attorney, Agent, or Firm* — Brooks, Cameron & Huebsch, PLLC (57) ABSTRACT

A multilayer structure including a first layer; a sealant layer formed from one or more ethylene-based polymers; and a cohesive failure layer adjacent to the sealant layer and formed from a polymer blend which comprises an elastomeric propylene based polymer and a second polymer, wherein the second polymer is selected from the group consisting of high pressure low density polyethylene, high density polyethylene, ethylene acrylic acid copolymers, ethylene(meth)acrylic acid copolymers and combinations thereof is provided.

15 Claims, 6 Drawing Sheets

(51) Int. Cl.

| | | |
|---|---|---|
| *B32B 27/32* | (2006.01) | |
| *B32B 27/30* | (2006.01) | |
| *B32B 7/12* | (2006.01) | |
| *B65D 65/38* | (2006.01) | |
| *B65D 65/14* | (2006.01) | |
| *B65D 85/72* | (2006.01) | |
| *B32B 7/00* | (2006.01) | |
| *B32B 7/02* | (2006.01) | |
| *B32B 7/04* | (2006.01) | |
| *B32B 7/06* | (2006.01) | |
| *B32B 27/00* | (2006.01) | |
| *B32B 27/06* | (2006.01) | |
| *B32B 27/28* | (2006.01) | |
| *B32B 1/00* | (2006.01) | |
| *B32B 1/02* | (2006.01) | |
| *B32B 3/00* | (2006.01) | |
| *B32B 3/02* | (2006.01) | |
| *B32B 3/06* | (2006.01) | |
| *B32B 3/30* | (2006.01) | |

(52) U.S. Cl.
CPC .......... *B32B 27/304* (2013.01); *B32B 27/306* (2013.01); *B32B 27/308* (2013.01); *B32B 27/32* (2013.01); *B32B 27/34* (2013.01); *B65D 65/14* (2013.01); *B65D 65/38* (2013.01); *B65D 85/72* (2013.01); *B32B 2270/00* (2013.01); *B32B 2307/50* (2013.01); *B32B 2307/7242* (2013.01); *B32B 2307/7244* (2013.01); *B32B 2307/7246* (2013.01); *B32B 2307/7248* (2013.01); *B32B 2307/7265* (2013.01); *B32B 2307/748* (2013.01); *B32B 2439/00* (2013.01); *B32B 2439/02* (2013.01); *B32B 2439/06* (2013.01); *B32B 2439/40* (2013.01); *B32B 2439/46* (2013.01); *B32B 2439/70* (2013.01); *B32B 2553/00* (2013.01); *B32B 2581/00* (2013.01)

(56) References Cited

U.S. PATENT DOCUMENTS

| | | | | |
|---|---|---|---|---|
| 4,904,731 | A | * | 2/1990 | Holden .................... C08L 23/02 525/89 |
| 5,093,164 | A | * | 3/1992 | Bauer ................. B29C 47/0021 428/349 |
| 5,273,797 | A | | 12/1993 | Hazelton et al. |
| 5,874,139 | A | | 2/1999 | Bosiers et al. |
| 7,863,383 | B2 | * | 1/2011 | Gibbons ................... B32B 7/06 524/515 |
| 2004/0151932 | A1 | | 8/2004 | Galloway |
| 2010/0310890 | A1 | | 12/2010 | Takeishi et al. |

FOREIGN PATENT DOCUMENTS

| | | |
|---|---|---|
| JP | 2001310431 | 11/2001 |
| JP | 2005028679 | 2/2005 |
| JP | 2005178337 | 7/2005 |
| WO | 2013101931 | 7/2013 |

* cited by examiner

MULTILAYER STRUCTURE, A FILM MADE THEREFROM AND A PACKAGE FORMED THEREFROM

FIELD OF INVENTION

The disclosure relates to a multilayer structure, a film made therefrom and a package formed therefrom.

BACKGROUND OF THE INVENTION

Reliable and reproducible easy open packages are generally hard to find as it such properties depend upon the sealant layer composition, sealing conditions and/or aging time. Variability in these properties is particularly pronounced in packages with different package and lid compositions (e.g. rigid containers and lids, flexible containers and lids). There remains a need for multilayer structures allowing easy open sealing areas and which may be used in a variety of applications and with a wide variety of processing conditions.

SUMMARY OF THE INVENTION

The disclosure is for a multilayer structure, a film made therefrom and a package formed therefrom.

In one embodiment, the disclosure provides a multilayer structure comprising a first layer; a sealant layer formed from one or more ethylene-based polymers; and a cohesive delamination layer adjacent to the sealant layer and formed from a polymer blend which comprises an elastomeric propylene based polymer and a second polymer, wherein the second polymer is selected from the group consisting of high pressure low density polyethylene, high density polyethylene, ethylene acrylic acid copolymers, ethylene(meth) acrylic acid copolymers and combinations thereof.

In alternative embodiments, the disclosure provides a film made from the multilayer structure, a package made therefrom and a lid formed from the multilayer structure or film.

DETAILED DESCRIPTION OF THE INVENTION

The disclosure provides a multilayer structure, a film made therefrom and a package formed therefrom.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "olefin-based polymer," as used herein, refers to a polymer that comprises a majority amount of polymerized olefin monomer, for example ethylene or propylene (based on weight of the polymer) and, optionally, may contain at least one comonomer.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used herein, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "ionomer," as used herein means (or includes) polyethylene based copolymers modified with cations to provide ionic links. These copolymers are well known and described at The Wiley Encyclopedia of Packaging Technology or Handbook of Engineering and Specialty Thermoplastics, Polyolefins and Styrenics.

The terms "cyclic olefin copolymers" and "COC," are known and described, for example, in EP-A-0 407 870, EP-A-0 485 893, EP-A-0 503 422, and DE-A-40 36 264, the disclosures of which are incorporated herein by reference.

The multilayer structure according to a first embodiment of the invention provides a multilayer structure comprising a first layer; a sealant layer formed from one or more ethylene-based polymers; and a cohesive failure layer adjacent to the sealant layer and formed from a polymer blend which comprises an elastomeric propylene based polymer and a second polymer, wherein the second polymer is selected from the group consisting of high pressure low density polyethylene, high density polyethylene, ethylene acrylic acid copolymers, ethylene(meth)acrylic acid copolymers and combinations thereof.

The film according to another embodiment of the invention comprises one or more multilayer structures according to any embodiment described herein.

The package according to yet another embodiment of the invention comprises one or more components formed from the multilayer structure according to any embodiment described herein.

The lid for a package according to another embodiment of the invention comprises a lid formed from the multilayer structure according to any embodiment disclosed herein.

In embodiments of the multilayer structure, the cohesive failure layer is adjacent to the sealant layer. As used in this context, adjacent means that the cohesive failure layer abuts the sealing layer over at least a portion of a surface of the sealing layer. The polymer blend from which the cohesive failure layer is formed may include any one or more polymer blends, each of which comprises an elastomeric propylene based polymer and a second polymer, wherein the second polymer is selected from the group consisting of high pressure low density polyethylene, high density polyethylene, ethylene acrylic acid copolymers, ethylene(meth) acrylic acid copolymers and combinations thereof. Various combinations of such polymer blends are described, for example, in U.S. Pat. No. 7,863,383 and PCT Publication WO2013101931, the disclosures of which are incorporated herein by reference. Commercial polymer blends are available under the name SEALUTION, from The Dow Chemical Company (Midland, Mich., USA).

In yet another embodiment, the disclosure provides a multilayer structure, film, package or lid in accordance with any embodiment described herein, except that a seal force of the multilayer structure with any olefin-based layer does not substantially increase with increasing sealing temperature. As used in this context, "substantially increase" means an increase of 50% with an increase of 40° C. in sealing temperature.

In yet another embodiment, the disclosure provides a multilayer structure, film, package or lid in accordance with any embodiment described herein, except that the sealing layer is made from one or more materials selected from the group consisting of ethylene-based polymers, polar ethylene based copolymers, and ionomers.

In yet another embodiment, the disclosure provides a multilayer structure, film, package or lid in accordance with any embodiment described herein, except that the sealing layer has a thickness equal to or less than 50 microns. All individual values and subranges from equal to or less than 50 microns are included and disclosed herein. For example, the sealing layer may have a thickness equal to or less than 50 microns, or in the alternative, equal to or less than 20 microns, or in the alternative, equal to or less than 10 microns. In a particular embodiment, the lower limit of the sealing layer thickness is 0.5 micron. A skilled artisan would understand that the lower thickness limit is generally defined by the extrusion equipment limitations and may range from 0.5 to 5 microns, with all individual values therebetween disclosed herein. In yet another embodiment, the disclosure provides a multilayer structure, film, package or lid in accordance with any embodiment described herein, except that the multilayer structure has 3 or more layers. All individual values from at least 3 layers are included and disclosed herein. For example, the multilayer structure may have 3, 4, 5, 6, or 7 layers.

In yet another embodiment, the disclosure provides a multilayer structure, film, package or lid in accordance with any embodiment described herein, except that the sealant layer consists of low density polyethylene. Any low density polyethylene may be used. Exemplary LDPE include 640i, LDPE 219M, LDPE 132i, LDPE 515E, LDPE 301E, all commercially available from The Dow Chemical Company.

In yet another embodiment, the disclosure provides a multilayer structure, film, package or lid in accordance with any embodiment described herein, except that the sealant layer is formed from 1 to 100 wt % one or more polymers selected from LLDPE, olefin-based plastomers and ionomers and, optionally, from 1 to 50 wt % one or more materials selected from COC, HDPE and PP ad PP based copolymers. All individual values and subranges from 1 to 100 wt % one or more polymers selected from LLDPE, olefin-based plastomers and ionomers are included and disclosed herein; for example, the amount of such components may range from a lower limit of 1, 15, 30, 45, 60, 75 or 90 wt % to an upper limit of 10, 25, 40, 55, 70, 85 or 100 wt %. For example, the amount of one or more polymers selected from LLDPE, olefin-based plastomers and ionomers can be from 1 to 100 wt %, or in the alternative, from 50 to 100 wt %, or in the alternative, from 1 to 50 wt %, or in the alternative, from 25 to 75 wt %, or in the alternative, from 40 to 80 wt %. When present, the amount of one or more materials selected from COC, HDPE and PP can range from 1 to 50 wt %. All individual values and subranges from 1 to 50 wt % are included and disclosed herein; for example, the amount of such components can range from a lower limit of 1, 10, 20, 30 or 40 wt % to an upper limit of 5, 15, 25, 35, 45 or 50 wt %. For example, the amount of one or more materials selected from COC, HDPE and PP can range from 1 to 50 wt %, or in the alternative, from 1 to 25 wt %, or in the alternative, from 25 to 50 wt %, or in the alternative, from 10 to 25 wt %.

In yet another embodiment, the disclosure provides a multilayer structure, film, package or lid in accordance with any embodiment described herein, except that the sealant layer is formed from 1 to 100 wt % one or more polymers selected from LLDPE, olefin-based plastomers and ionomers and, optionally, from 20 to 99 wt % one or more materials selected from LDPE. All individual values and subranges from 1 to 100 wt % one or more polymers selected from LLDPE, olefin-based plastomers and ionomers are included and disclosed herein; for example, the amount of such components may range from a lower limit of 1, 15, 30, 45, 60, 75 or 90 wt % to an upper limit of 10, 25, 40, 55, 70, 85 or 100 wt %. For example, the amount of one or more polymers selected from LLDPE, olefin-based plastomers and ionomers can be from 1 to 100 wt %, or in the alternative, from 50 to 100 wt %, or in the alternative, from 1 to 50 wt %, or in the alternative, from 25 to 75 wt %, or in the alternative, from 40 to 80 wt %. All individual values and subranges from 20 to 99 wt % one or more materials selected from LDPE are included and disclosed herein; for example, when present, the amount of one or more materials selected from LDPE may range from a lower limit of 20, 30, 40, 50, 60, 70, 80 or 90 wt % to an upper limit of 25, 35, 45, 55, 5, 75, 85, 95 or 99 wt %. For example, when present, the amount of one or more materials selected from LDPE may range from 20 to 99 wt %, or in the alternative, from 50 to 99 wt %, or in the alternative, from 20 to 50 wt %.

In yet another embodiment, the disclosure provides a multilayer structure, film, package or lid in accordance with any embodiment described herein, except that the multilayer structure further comprises one or more additional layers selected from the group consisting of barrier layers and tie layers. In a particular embodiment, the multilayer structure comprises one or more barrier layers. In a specific embodiment, the one or more barrier layers is formed from one or more of polyamide, ethylene vinylalcohol and polyvinylidene chloride.

In another embodiment, the disclosure provides a film formed by adhesion of any embodiment of the multilayer structure disclosed herein to a substrate selected from the group consisting of monolayer and multilayer films. Lamination substrates includes OPET, BOPP, PA, BOPA, PVOH and other substrates.

In yet another embodiment, the disclosure provides a package in accordance with any embodiment described herein, except that the package is a pouch.

In yet another embodiment, the disclosure provides a package in accordance with any embodiment described herein, except that the package is a food or beverage container.

Figure 1A:
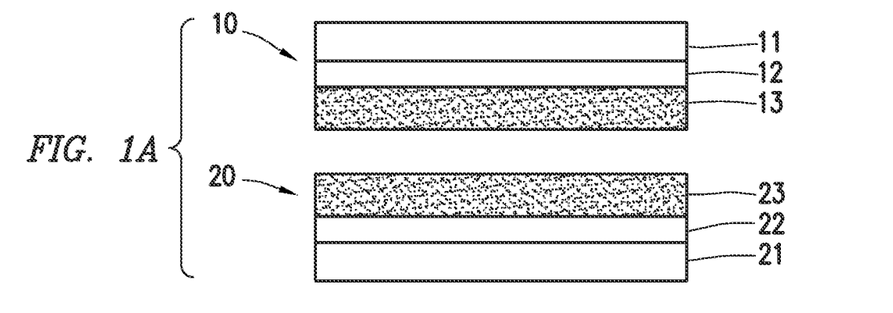
FIG. 1A is a schematic illustrating two multilayer structures according to an embodiment of the invention prior to sealing.
Figure 1B:
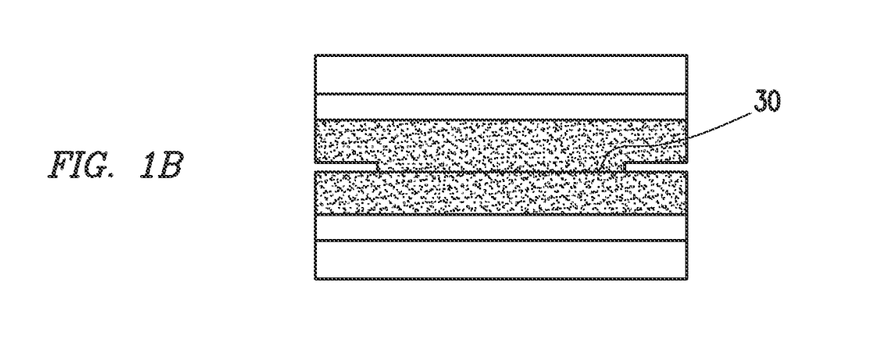
FIG. 1B is a schematic illustrating the two multilayer structures following sealing of the two structures.
Figure 1C:
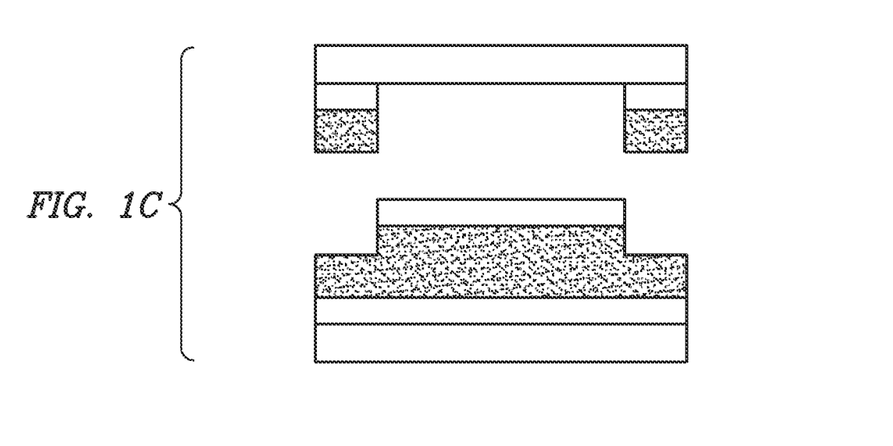
FIG. 1C is a schematic illustrating the sealing area following application of force to open the seal.

FIG. 1 illustrates a seal formed using one embodiment of the inventive multilayer structure. As shown in FIG. 1a, a first film 10 includes an external layer 11, a cohesive failure layer 12 and a sealant layer 13. Likewise, a second film 20 includes an external layer 21, a cohesive failure layer 22 and a sealant layer 23. In FIG. 1a, the sealant layers of each of the first and second films are facing each other. In FIG. 1b, the two sealant layers are fused in a sealing area 30. FIG. 1c illustrates the sealing area 39 following application of a force to pull the first and second films apart. As can be seen in FIG. 1c, the first and second films are separated by cohesive failure within the cohesive failure layer 12 of the first film. Alternatively, cohesive failure could occur in the cohesive failure layer 22 of the second film 20 or in both of layers 12 and 22.

EXAMPLES

The following examples illustrate the present invention but are not intended to limit the scope of the invention.

Resins used in forming the comparative and inventive examples are described in Table 1.

TABLE 1

| Resin | Commercial Name/Supplier | Type | $I_2$ or MFR (g/10 min) | Density (g/cm$^3$) |
|---|---|---|---|---|
| Resin 1 | RP 240/Braskem (São Paulo, Brasil) | rPP | 1.50* | 0.900 |
| Resin 2 | VERSIFY 2200/ The Dow Chemical Co. (TDCC) (Midland, MI, USA) | propylene/ ethylene plastomer | 2.00* | 0.888 |
| Resin 3 | LDPE 301/ TDCC | LDPE | 2.00** | 0.920 |
| Resin 4 | DOWLEX TG2085B/ TDCC | LLDPE | 0.95** | 0.919 |
| Resin 5 | ELITE 5960G/ TDCC | HDPE | 0.85** | 0.965 |

*MFR @ 2.16 kg, 230° C.
**$I_2$ @ 2.16 kg, 190° C.

Five layer structures, having a layer structure designated as A/B/C/D/E. were prepared to illustrate comparative and inventive multilayer structures. Layer A is a sealing layer, Layer B is a cohesive failure layer, and Layers C, D, and E are additional layers with Layer E being the outermost layer. Table 2 provides the structure and layer composition of Comparative multilayer structures 1-6 (Comp. Ex. 1-6) and Inventive multilayer structures 1-3 (Inv. Ex. 1-3). For example, as illustrated in Table 2, Resin 1 is used to make layer A of Comp. Ex. 1 and 50 wt % Resin 2 and 50 wt % Resin 3 is used to make layer B of Comp. Ex. 1.

TABLE 2

| Film | | Comp Ex. 1 | Comp Ex. 2 | Comp Ex. 3 | Comp Ex. 4 | Comp Ex. 5 | Inv. Ex. 1 | Inv. Ex. 2 | Inv. Ex. 3 | Comp. Ex. 6 |
|---|---|---|---|---|---|---|---|---|---|---|
| Thickness | | 60 | 60 | 60 | 60 | 60 | 60 | 60 | 60 | 60 |
| % | A | 10 | 20 | 30 | 10 | 10 | 10 | 10 | 10 | 10 |
| | B | 30 | 30 | 30 | 20 | 10 | 30 | 30 | 30 | 30 |
| | C | 20 | 20 | 20 | 30 | 30 | 20 | 20 | 20 | 30 |
| | D | 20 | 15 | 10 | 20 | 30 | 20 | 20 | 20 | 20 |
| | E | 20 | 15 | 10 | 20 | 20 | 20 | 20 | 20 | 20 |
| Resin | A | 1 | 1 | 1 | 1 | 1 | 5 | 4 | 4 | 50% 2/ 50% 3 |
| | B | 50% 2/ 50% 3 | 50% 2/ 50% 3 | 50% 2/ 50% 3 | 50% 2/ 50% 3 | 50% 2/ 50% 3 | 50% 2/ 50% 3 | 50% 2/ 50% 3 | 50% 2/ 50% 3 | 5 |
| | C | 5 | 5 | 5 | 5 | 5 | 1 | 5 | 1 | 5 |
| | D | 5 | 5 | 5 | 5 | 5 | 1 | 5 | 1 | 5 |
| | E | 5 | 5 | 5 | 5 | 5 | 1 | 5 | 1 | 5 |

Figure 2:
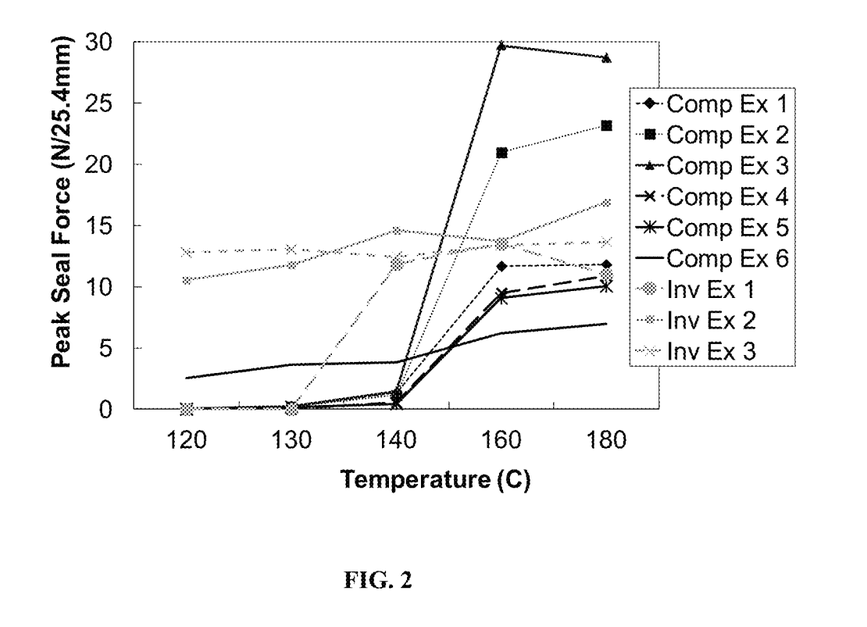
FIG. 2 is a graph illustrating the peak seal strength as a function of temperature for Comp. Ex. 1-6 and Inv. Ex. 1-3.

The films were sealed using conventional heat seal conditions (layer A being sealed onto layer E) and were tested to measure sealing force. The sealing force results are illustrated in FIG. 2. Referring to FIG. 2, it is seen that the seal force is dependent upon the sealing layer thickness and the heat seal initiation temperature (HSIT) is dependent on seal layer composition. The thickness of the cohesive failure layer also has an impact on sealing strength, the lower the sealing layer thickness the lower the seal strength. Inventive examples 1 to 3 exhibit a broad seal window; that is, the films can be used in a wide range of sealing temperatures, with heat seal temperatures from 120° C. to 180° C.

Additional examples were produced to illustrate the sealing of two different film structures. Inv. Ex. 1 was sealed to a commercial thermoforming bottom film having the following structure: Resin 4/Tie Layer/Barrier Layer/Tie Layer/External Layer, to form Inv. Ex. 4. Specifically, Layer A of Inv. Ex. 1 was sealed to the Resin 4 Layer of the commercial film using a Multivac R145 with a seal time of 1 second and a sealing temperature of 150° C.

Using the same conditions, Comp. Ex. 6 was sealed to the same commercial thermoforming bottom film to form Comp. Ex. 7.

Each of Inv. Ex. 4 and Comp. Ex. 7 were cut to form a specimen with 25.4mm width and were opened in a standard universal testing machine using the procedure described in ASTM F88. The results are shown in Table 3.

TABLE 3

|  | Seal Temperature (° C.) | Seal Strength (N) |
|---|---|---|
| Comp. Ex. 7 | 150 | 72.08 |
| Inv. Ex. 4 | 150 | 14.3 |

Additional inventive and comparative examples were formed utilizing the resins listed and described in Tables 2 and 4.

TABLE 4

| Resin | Commercial Name/ Supplier | Type | I$_2$ or MFR (g/10 min) | Density (g/$cm^3$) |
|---|---|---|---|---|
| Resin 6 | DOWLEX 2050B/ TDCC | HDPE | 0.95** | 0.950 |
| Resin 7 | DOWLEX NG 2038.11B/ TDCC | MDPE | 1.00** | 0.935 |
| Resin 8 | DOWLEX 2049B/ TDCC | LLDPE | 1.00** | 0.926 |

Table 5 describes the structure of Comp. Ex.8 and Inv. Ex. 5-8.

TABLE 5

| Film | | Comp Ex. 8 | Inv Ex. 5 | Inv Ex. 6 | Inv Ex. 7 | Inv Ex. 8 |
|---|---|---|---|---|---|---|
| Thickness | | 90 | 90 | 90 | 90 | 90 |
| % | A | 35 | 10 | 10 | 10 | 10 |
|  | B | 10 | 35 | 35 | 35 | 35 |
|  | C | 10 | 10 | 10 | 10 | 10 |
|  | D | 22.5 | 22.5 | 22.5 | 22.5 | 22.5 |
|  | E | 22.5 | 22.5 | 22.5 | 22.5 | 22.5 |
| Resin | A | 50% 2/ 50% 3 | 80% 6/ 20% 3 | 80% 7/ 20% 3 | 80% 8/ 20% 3 | 80% 4/ 20% 3 |
|  | B | 4 | 50% 2/ 50% 3 | 50% 2/ 50% 3 | 50% 2/ 50% 3 | 50% 2/ 50% 3 |
|  | C | 4 | 4 | 4 | 4 | 4 |
|  | D | 4 | 4 | 4 | 4 | 4 |
|  | E | 4 | 4 | 4 | 4 | 4 |

Each of Comp. Ex. 8 and Inv. Ex. 5-8 were sealed to the commercial thermoforming bottom film (with a thickness of 160 microns) described above according to ASTM F88. However, the seals were opened using the procedure shown in FIG. 3. FIG. 4 illustrates the peak seal force as a function of temperature for each of Comp. Ex. 8 and Inv. Ex. 5-8. As can be seen in FIG. 4, the Inv. Ex. 5-8 exhibit more stable values in a broader range of temperatures.

Comparative Examples 9 and 10 and Inventive Examples 9 and 10 were produced having the composition and structure described in Table 6. In this set, 2 different bottom films were used; both with 160 microns thickness and composed of 100% resin 4 (bottom film 1) or 100% resin 3 (bottom film 2).

TABLE 6

| Film | | Comp Ex. 9 | Inv Ex.9 | Comp Ex. 10 | Inv Ex.10 |
|---|---|---|---|---|---|
| Thickness | | 90 | 90 | 90 | 90 |
| % | A | 35 | 10 | 35 | 10 |
|  | B | 10 | 35 | 10 | 35 |
|  | C | 10 | 10 | 10 | 10 |
|  | D | 22.5 | 22.5 | 22.5 | 22.5 |
|  | E | 22.5 | 22.5 | 22.5 | 22.5 |
| Resin | A | 50% 2/ 50% 3 | 80% 6/ 20% 3 | 75% 2/ 25% 3 | 80% 8/ 20% 3 |
|  | B | 4 | 50% 2/ 50% 3 | 4 | 75% 2/ 25% 3 |
|  | C | 4 | 4 | 4 | 4 |
|  | D | 4 | 4 | 4 | 4 |
|  | E | 4 | 4 | 4 | 4 |

Figure 5:
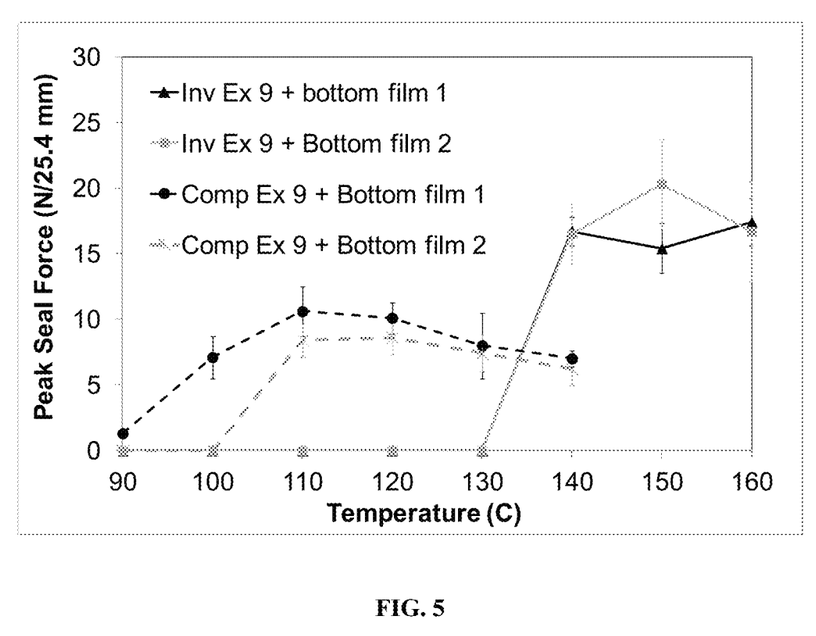
FIG. 5 is a graph illustrating the peak seal force as a function of temperature for Comp. Ex. 9 (plus bottom films 1 and 2) and Inv. Ex. 9 (plus bottom films 1 and 2)
Figure 6:
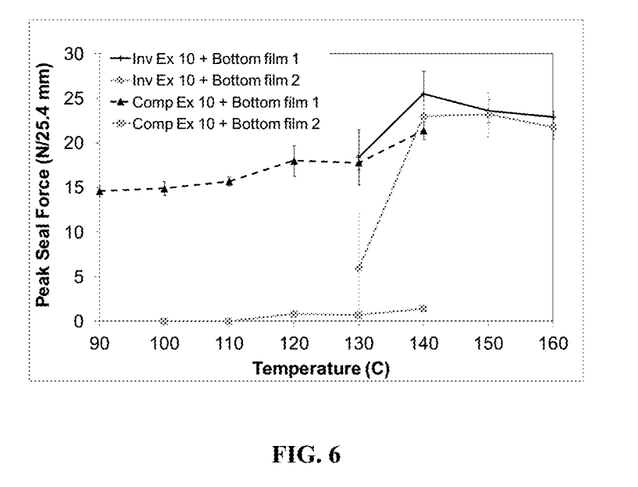
FIG. 6 is a graph illustrating the peak seal force as a function of temperature for Comp. Ex. 10 (plus bottom films 1 and 2) and Inv. Ex. 10 (plus bottom films 1 and 2)

The seal forces are illustrated in FIGS. 5 and 6, with the combinations of the 4 different top films with the 2 different bottom films. These results illustrate the consistency of seal force achieved when the compositions of the cohesive failure layer are used adjacent to the sealing layer (Inv. Ex. 9 ad 10) versus using such cohesive failure compositions as the sealing layer (Comp. Ex. 9 and 10).

Additional examples were prepared using the resins described in Tables 2, 4 and 7.

TABLE 7

| Resin | Commercial Name/ Supplier | Type | I2@2.16 kg, 190° C. (g/10 min) | Density (g/$cm^3$) |
|---|---|---|---|---|
| Resin 9 | AMPLIFY TY 1352/ TDCC | MAH graft | 1.00 | — |
| Resin 4 | DOWLEX TG 2085B/ TDCC | LLDPE | 0.95 | 0.919 |
| Resin 10 | SURLYN 1650/E. I. du Pont de Nemours and Company (Wilmington, DE, USA) | Ionomer | 1.80 | 0.940 |
| Resin 11 | UBE 5034B/UBE Corporation Europe SA (Spain) | Polyamide | Not available | Not available |

* MFR @ 2.16 kg, 230° C.

Figure 7:
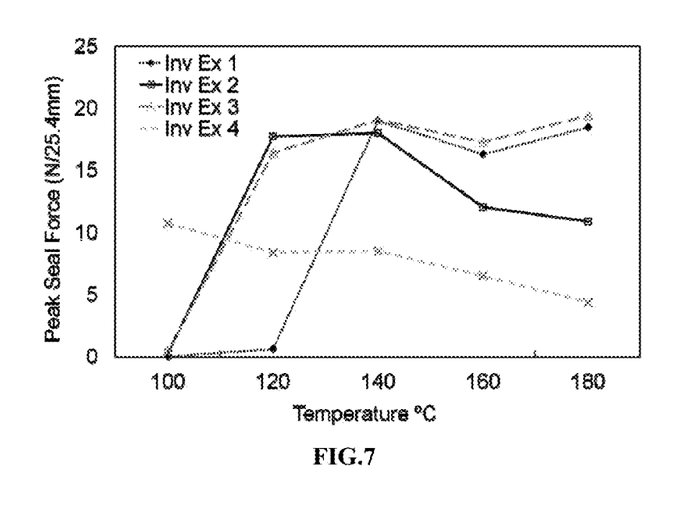
FIG. 7 is a graph illustrating the peak seal force as a function of temperature for Inv. Ex. 11-14.

The films were produced in a blown film Collin line, and tested using standard heat seal methods (ASTM F88). The film structures are described in Table 8 and heat seal results are shown FIG. 7.

TABLE 8

| Film | | Inv. Ex. 11 | Inv. Ex. 12 | Inv. Ex. 13 | Inv. Ex. 14 |
|---|---|---|---|---|---|
| Thickness | | 70 | 70 | 70 | 70 |
| % | A | 10 | 10 | 10 | 10 |
|  | B | 29 | 29 | 29 | 29 |
|  | C | 28 | 28 | 28 | 28 |
|  | D | 7 | 7 | 7 | 7 |
|  | E | 26 | 26 | 26 | 26 |
| Resin | A | 6 | 4 | 4 | 10 |
|  | B | 50% 2/ 50% 3 | 50% 2/ 50% 3 | 50% 2/ 50% 3 | 50% 2/ 50% 3 |

TABLE 8-continued

| Film | Inv. Ex. 11 | Inv. Ex. 12 | Inv. Ex. 13 | Inv. Ex. 14 |
|---|---|---|---|---|
| C | 6 | 6 | 9 | 6 |
| D | 9 | 9 | 9 | 9 |
| E | 11 | 11 | 11 | 11 |

Test Methods

Test methods include the following:

Density was measured according to ASTM-D 792.

Melt index, $I_2$, is measured according to ASTM D-1238 at 190° C. and at 2.16 kg.

Melt Flow Rate, MFR, is measured according to ASTM D1238.

Figure 3A:
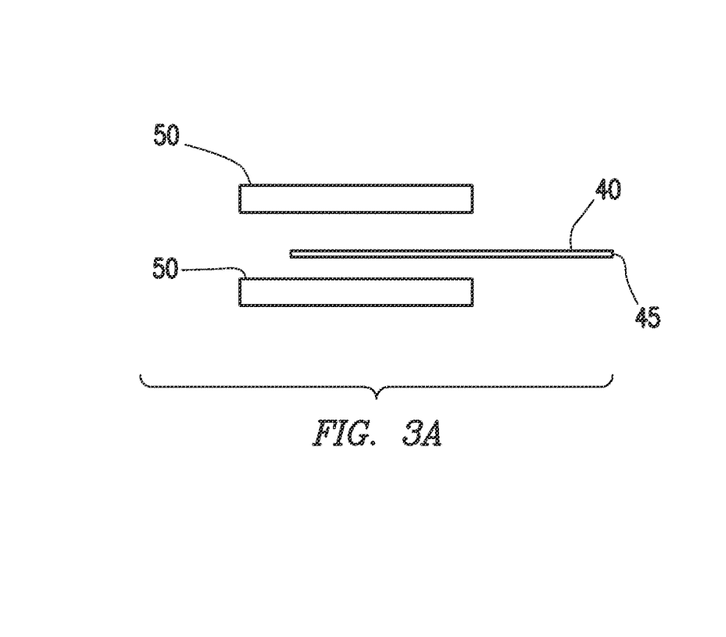
FIG. 3A is a schematic illustrating the equipment used to measure peak seal strength for the examples.
Figure 3B:
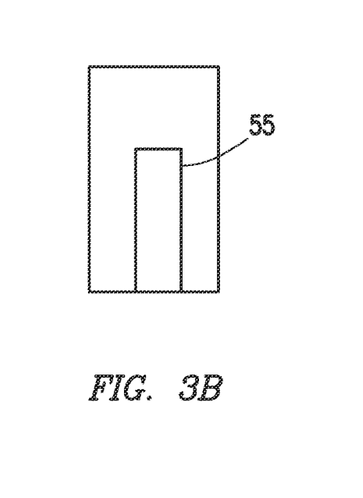
FIG. 3B is a schematic illustrating the sealing bars pressing against multilayer structures to form a seal.
Figure 3C:
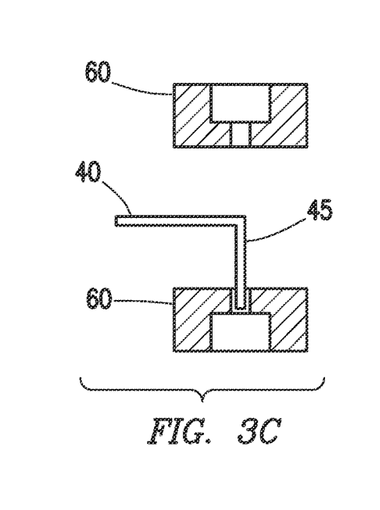
FIG. 3C is a schematic illustrating the process of opening the seal to measure the seal strength.
Figure 4:
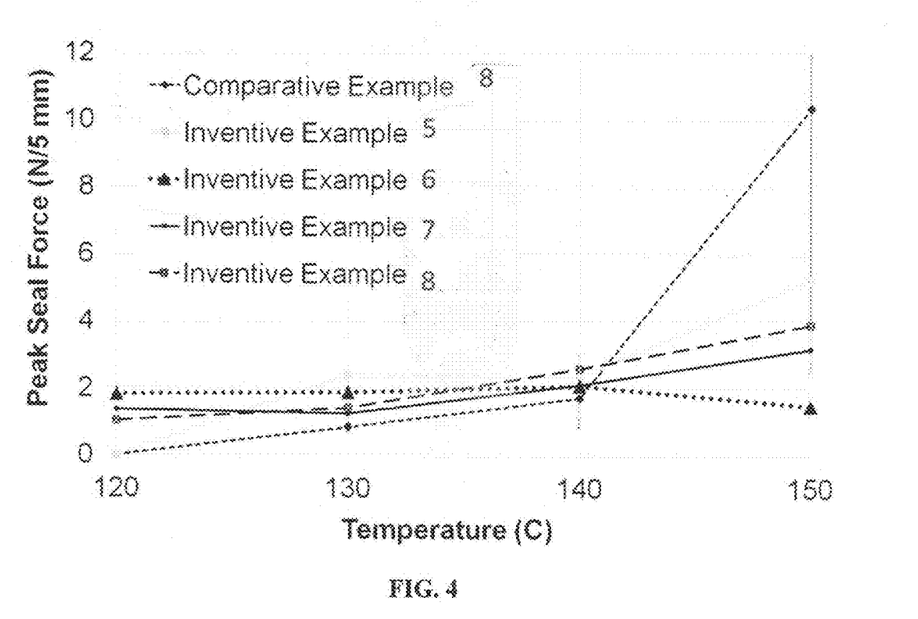
FIG. 4 is a graph illustrating the peak seal force as a function of temperature for Comp. Ex. 8 and Inv. Ex. 5-8.

Peak seal strength/force was measured according to ASTM F88 and using the equipment schematically illustrated in FIG. 3. As can be seen in FIG. 3a, a film having a top layer 40 and a bottom layer 45 is provided as well as two sealing bars 50. The sealing bars are heated and pressed against opposite sides of the film to form a sealed area 55, as seen in FIG. 3b. FIG. 3c illustrates the process of opening the sealed area 55 using pulling mechanisms 60 one each on the top layer 40 and bottom layer 45.

The present invention may be embodied in other forms without departing from the spirit and the essential attributes thereof, and, accordingly, reference should be made to the appended claims, rather than to the foregoing specification, as indicating the scope of the invention.

We claim:

1. A multilayer structure comprising:
   a first layer;
   a sealant layer formed from one or more ethylene-based polymers; and
   a cohesive failure layer adjacent to the sealant layer and formed from a polymer blend which comprises an elastomeric propylene based polymer and a second polymer, wherein the second polymer is selected from the group consisting of high pressure low density polyethylene, high density polyethylene, ethylene acrylic acid copolymers, ethylene (meth) acrylic acid copolymers and combinations thereof, the multilayer structure having a seal force that does not substantially increase with increasing sealing temperature.

2. The multilayer structure according to claim 1, wherein the ethylene-based polymers are selected from the group consisting of polar ethylene based copolymers and ionomers.

3. The multilayer structure according to claim 1, wherein the sealant layer has a thickness equal to or less than 50 microns.

4. The multilayer structure according to claim 1, wherein the multilayer structure has 3 or more layers.

5. The multilayer structure according to claim 1, wherein the sealant layer consists of low density polyethylene.

6. The multilayer structure according to claim 1, wherein the sealant layer is formed from 1 to 100 wt % one or more polymers selected from LLDPE, olefin-based plastomers and ionomers and, optionally, from 1 to 50 wt % one or more materials selected from COC, HDPE and PP.

7. The multilayer structure according to claim 1, wherein the sealant layer is formed from 1 to 100 wt % one or more polymers selected from LLDPE, olefin-based plastomers and ionomers and, optionally, from 20 to 99 wt % one or more materials selected from LDPE.

8. The multilayer structure according to claim 1 wherein the multilayer structure further comprises one or more additional layers selected from the group consisting of barrier layers and tie layers.

9. The multilayer structure according to claim 8 wherein the barrier layer is formed from one or more of polyamide, ethylene vinylalcohol and polyvinylidene chloride.

10. A first film comprising the multilayer structure according to claim 1.

11. The first film of claim 10 laminated onto a substrate selected from the group consisting of monolayer and multilayer films using one or more adhesives.

12. A package comprising one or more components formed from the multilayer structure according to claim 1.

13. The package according to claim 12 wherein the package is a pouch.

14. The package according to claim 12, wherein the package is a food or beverage container.

15. A lid for a package, wherein the lid is formed from the multilayer structure according to claim 1.

* * * * *